United States Patent
Dutzi et al.

(10) Patent No.: US 6,942,231 B2
(45) Date of Patent: Sep. 13, 2005

(54) SINGLE PASSIVE ANTI-ROLL COMPENSATOR

(75) Inventors: Robert K. Dutzi, Palatine, IL (US); Kenneth S. Dobson, Chicago, IL (US); Jason K. Trotter, Des Plaines, IL (US)

(73) Assignee: Illinois Tool Works Inc., Glenview, IL (US)

(*) Notice: Subject to any disclaimer, the term of this patent is extended or adjusted under 35 U.S.C. 154(b) by 219 days.

(21) Appl. No.: 10/419,498

(22) Filed: Apr. 21, 2003

(65) Prior Publication Data

US 2003/0230864 A1 Dec. 18, 2003

Related U.S. Application Data

(60) Provisional application No. 60/387,993, filed on Jun. 12, 2002.

(51) Int. Cl.[7] .............................................. B60G 21/05
(52) U.S. Cl. ...................... 280/124.106; 280/124.134; 280/124.137; 280/124.149
(58) Field of Search ........................... 280/5.506, 5.507, 280/5.508, 5.512, 5.513, 124.106, 124.134, 124.137, 124.149, 5.511, 124.104, 124.107

(56) References Cited

U.S. PATENT DOCUMENTS

| | | | | |
|---|---|---|---|---|
| 4,039,205 A | * | 8/1977 | Castanier | 280/124.109 |
| 4,648,620 A | * | 3/1987 | Nuss | 280/5.511 |
| 5,542,705 A | * | 8/1996 | Parker et al. | 280/124.103 |
| 5,732,969 A | * | 3/1998 | Spoto | 267/183 |
| 5,876,148 A | * | 3/1999 | Kraps | 403/119 |
| 6,059,276 A | * | 5/2000 | Dutzi et al. | 267/150 |
| 6,530,586 B2 | * | 3/2003 | Fader et al. | 280/124.106 |
| 6,659,475 B2 | * | 12/2003 | Clements et al. | 280/5.508 |
| 6,719,313 B2 | * | 4/2004 | Zadok | 280/124.106 |
| 6,722,676 B2 | * | 4/2004 | Zadok | 280/124.106 |
| 6,832,772 B2 | * | 12/2004 | Conover | 280/124.106 |

* cited by examiner

Primary Examiner—Paul N. Dickson
Assistant Examiner—Toan C. To
(74) Attorney, Agent, or Firm—Mark W. Croll; Paul F. Donovan

(57) ABSTRACT

A stabilizer for a vehicle suspension system having first and second pivotal components with an anchor above one of the pivotal components and an anchor below the other of the pivotal components. The stabilizer includes a bending member connected to the first and second anchors. The bending member can be of a variety of shapes to fit within the suspension systems architecture on various vehicles.

20 Claims, 3 Drawing Sheets

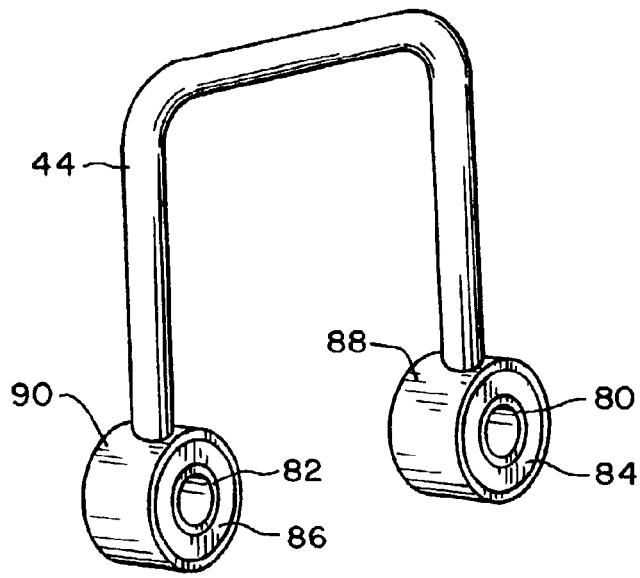
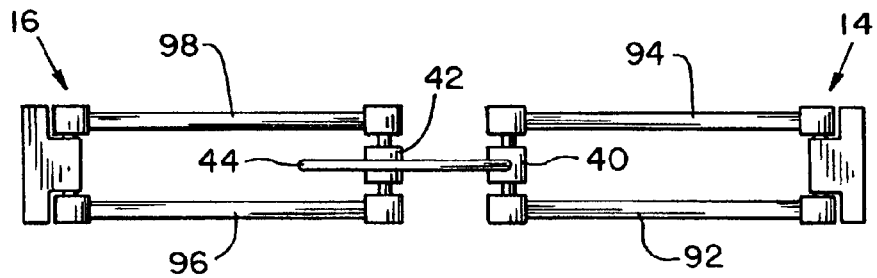
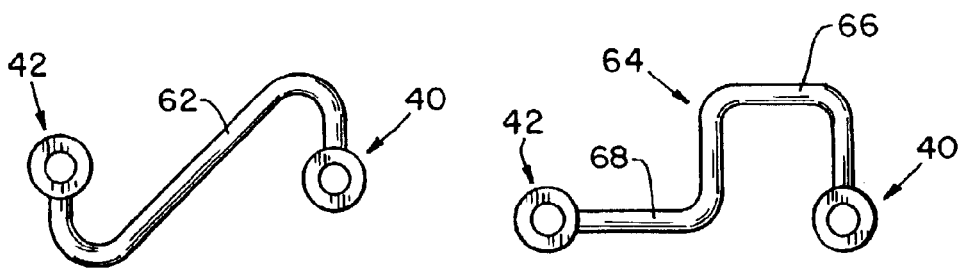

SINGLE PASSIVE ANTI-ROLL COMPENSATOR

CROSS-REFERENCE TO RELATED APPLICATION

This present application claims benefit to U.S. Provisional Application No. 60/387,993, filed on Jun. 12, 2002, and entitled "AUTOMOBILE STABILIZER DEVICE".

FIELD OF THE INVENTION

The present invention relates generally to automobile suspension systems, and, more particularly, to stabilizing systems used to resist and compensate for rolling motion of a vehicle, such as during cornering.

BACKGROUND OF THE INVENTION

Vehicle suspension systems are provided to smooth the ride, feel and operation of an automobile. The effect of vibrations, sudden wheel movements, and the like caused by uneven road surfaces, pot holes or other obstructions can be minimized through proper operation of the suspension system. Suspension systems in a variety of different forms have been used in the past, and continue to be used in present day vehicles. Anti-roll stabilizers are known components of vehicle suspension systems.

During cornering, as a result of body roll, the outside wheel of a car has a tendency to rise with respect to the frame of the vehicle, and the inside wheel has a tendency to drop. Basic suspension systems that dampen only abrupt vertical movements of the wheels independently do not adequately compensate for or control body roll. Over the years, many types of stabilizing systems have been used to compensate for body roll, with varying results. The basic function of a stabilizer is to urge downward the wheel that is tending to rise, and to urge upward the wheel that is tending to drop. Stabilizers have been used on both the front and back wheels of vehicles.

Known forms of stabilizers include torsion bars connected between the suspension systems for wheels on opposite sides of the vehicle. It is known to use both front and rear torsion bars. Other types of roll control systems have included sway bars, dual compensating stabilizer systems and single compensating stabilizer systems. Each has been known to have certain drawbacks or deficiencies. For example, stabilizing systems using torsion bars are tied or anchored to the vehicle frame. Vibrations and other movements from the suspension system are conveyed to the frame, resulting in less than optimum rider comfort. Moreover, these types of systems tend to be relatively expensive, and generally add a considerable amount of undesirable weight to the vehicle. Other types of stabilizer systems, while providing certain advantages over torsion bars and other known systems, can include somewhat complex components and/or assemblies. See, for example, U.S. Pat. No. 6,059,276 to Dutzi et al. Although the stabilizer system of the '276 patent is satisfactory for its intended purpose, there remains a desire to provide an improved stabilizer device which is economical to manufacture, easy to install, yet durable and reliable in operation.

Preferably, an improved stabilizer system will be both lightweight and rugged. If too much weight is added to the vehicle, the performance of the vehicle is adversely affected. Since the components of a stabilizer system often are exposed on the underside of the vehicle, it is important that each is durable in a relatively harsh environment that includes exposure to rain, mud, snow, ice, road chemicals and possible road debris.

What is needed in the art is a simple, single passive anti-roll compensator, which is easy to install, easy to maintain, inexpensive to manufacture, durable and reliable.

SUMMARY OF THE INVENTION

The present invention meets the aforementioned and other needs by providing a single, passive, anti-roll compensator in the nature of a bending member secured between an upper anchor on a pivotal member on one side of the vehicle suspension system, and a lower anchor on a pivotal member on the opposite side.

In one form thereof, the present invention provides a stabilizer system for a vehicle having a suspension system including first and second lateral links with spaced inner end portions. The stabilizer system has first and second pivotal components connected to the first and second lateral links and pivotal about corresponding first and second pivotal axes at the inner ends of the first and second lateral links. An upper anchor is provided above the first pivotal axis and associated with the first pivotal component to pivot about the first pivotal axis upon movement of the first lateral link. A lower anchor is provided below the second pivotal axis and associated with the second pivotal component to pivot about the second pivotal axis upon movement of the second lateral link. A bending member has a first end connected to the upper anchor and a second end connected to the lower anchor. The bending member is configured and arranged with the upper and lower anchors to be placed in one of tension and compression by pivotal movement of at least one of the first and second pivotal components.

In another form thereof, the present invention provides a stabilizer for a vehicle suspension system having first and second pivotal components pivotal about a first axis and a second axis, respectively, the first pivotal component including a first anchor above the first axis and the second pivotal component including a second anchor below the second axis. The stabilizer comprises a bending member having a first end connected to the first anchor and a second end connected to the second anchor. The bending member freely spans a space between the first and second anchors, and is configured and arranged with the upper and lower anchors to be placed in one of tension and compression by pivotal movement of at least one of the first and second pivotal components.

In still another form thereof, the present invention provides an anti-roll compensator for a vehicle suspension system, for damping compression and tension loads applied between first and second pivotal anchors of the vehicle suspension system. The compensator comprises a bending member having first and second ends connected to the first and second anchors. The bending member freely spans a space between the first and second anchors and is in substantial alignment therewith to be placed in one of tension and compression by movement of at least one of the first and second pivotal anchors.

An advantage of the present invention is providing an anti-roll compensator for an automobile suspension system that is lightweight and durable.

Another advantage of the present invention is providing an anti-roll compensator that is simple, inexpensive and reliable, with minimal parts subject to failure.

Still another advantage of the present invention is providing an anti-roll compensator that can be provided in a variety of shapes and configurations for installation in a variety of different suspension system architectures.

Other features and advantages of the invention will become apparent to those skilled in the art upon review of the following detailed description, claims and drawings in which like numerals are used to designate like features.

BRIEF DESCRIPTION OF THE DRAWINGS

FIG. 3 is a perspective view of a modified form of an anti-roll compensator in accordance with the present invention;

FIG. 4 is a plan view of a vehicle stabilizer system showing an alternate manner in which the anti-roll compensator of the present invention can be installed; and FIGS. 5, 6 and 7 are elevational views of modified shapes of anti-roll compensators in accordance with the present invention.

Figure 1:
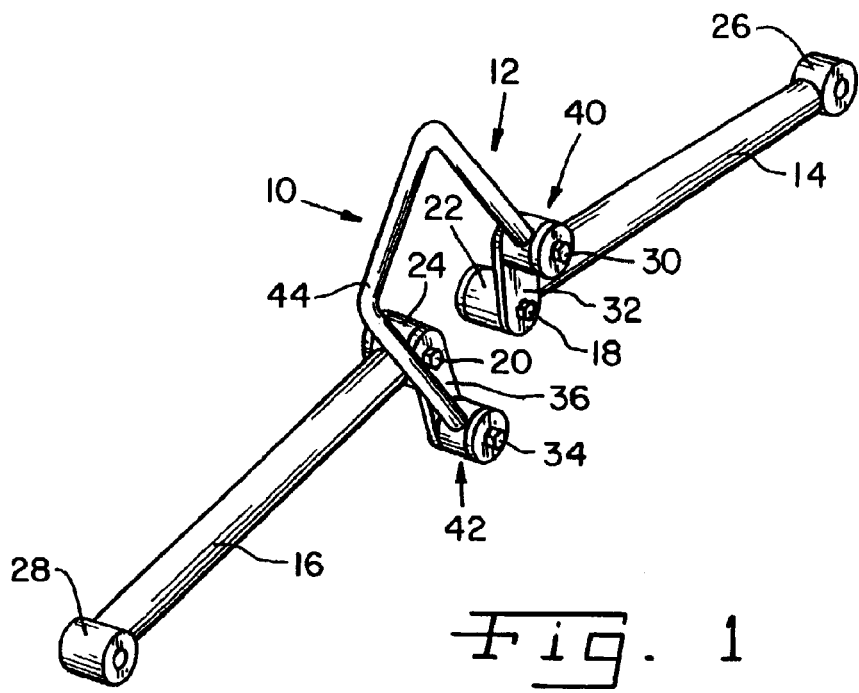
FIG. 1 is a perspective view of a portion of a vehicle suspension system including an anti-roll compensator in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE PREFERRED EMBODIMENT

Referring now more specifically to the drawings and to FIG. 1 in particular, an anti-roll compensator 10 according to the present invention is shown as part of a stabilizer system 12 for the suspension system of a vehicle.

Stabilizer system 12 includes a first lateral link or suspension member 14 and a second lateral link or suspension member 16, which may, for example, be right and left control arms of the vehicle. First suspension member 14 is mounted to the vehicle for rotation about a first pivotal axis defined by a first pivot pin 18 and second suspension member 16 is mounted to the vehicle for a rotation about a second pivotal axis defined by a second pivot pin 20. First and second pivot pins 18 and 20 are connected to first and second inner end portions 22 and 24 of first and second suspension members 14 and 16, respectively, which may generally form collars for surrounding first and second pivot pins 18 and 20. First and second inner end portions 22 and 24 are spaced from each other. Outer end portions 26 and 28 of first and second suspension members 14 and 16, respectively, are connected to the vehicle suspension system to move generally upwardly and downwardly, as known to those skilled in the art, but not shown in the drawings. Upward or downward movement of outer end portions 26 and 28 result in a pivotal movement of first and second inner end portions 22 and 24 about first pivot pin 18 and second pivot pin 20, respectively.

An upper anchor 30 is connected to one of the first and second suspension members 14 and 16 generally above the pivot pin 18 or 20 thereof. In the embodiment shown, upper anchor 30 is connected to a first pivotal component 32 of first suspension member 14 in the nature of a bellcrank connected to first inner end portion 22. A second or lower anchor 34 is provided connected to the other of first suspension member 14 and second suspension member 16. In the embodiment shown, lower anchor 34 is connected to a second pivotal component 36 of second suspension member 16 in the nature of a bellcrank connected to second inner end portion 24.

Upper anchor 30 and lower anchor 34 are provided on outer portions of first and second pivotal components 32 and 36, respectively. Anchors 30 and 34 thereby rotate about first pivotal axis 18 and second pivotal axis 20 in proportion to the upward and downward movement of outer end portions 26 and 28 of first and second suspension members 14 and 16, respectively. Anti-roll compensator 10 is connected at a first end 40 thereof to upper anchor 30 and at a second end 42 thereof to lower anchor 34. Advantageously, first end 40 and the second end 42 of anti-roll compensator 10 are pivotally connected to upper anchor 30 and lower anchor 34, respectively, by defining collars rotatably supported on upper and lower anchors 30 and 34 in the nature of pins.

Figure 2:
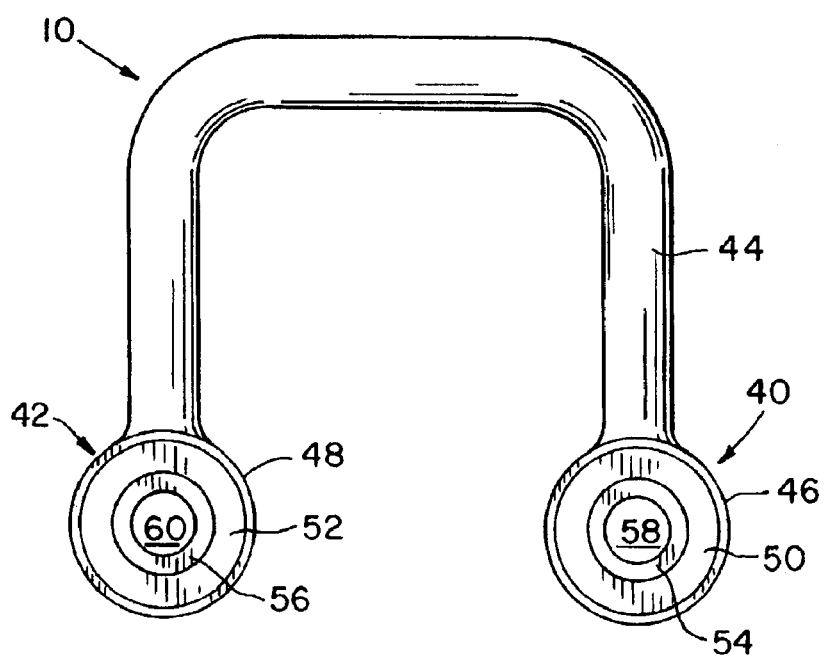
FIG. 2 is an enlarged elevational view of the anti-roll compensator shown in FIG. 1.

Between first end 40 and second end 42, anti-roll compensator 10 includes a bending member 44, which may be of a solid metal such as steel, titanium or the like, or bending member 44 may be a composite structure of plastic having oriented carbon fiber therein. It is anticipated that in typical installations at least a portion of first end 40, a portion of second end 42 and bending member 44 will be formed as a monolithic structure of the same material. As illustrated in FIG. 2, first end 40 includes a first ring 46 and second end 42 includes a second ring 48 each formed integrally with bending member 44. First and second resilient members 50, 52, and first and second rigid bushings 54, 56, are provided in first and second rings 46 and 48, respectively. Circular openings 58 and 60 are defined by rigid bushings 54 and 56 to receive upper anchor 30 and lower anchor 34, respectively. Resiliently mounted in this way, first and second ends 40 and 42 absorb minor deflections occurring during use, and isolate the operation and vibration of compensator 10 from the passenger compartment of the vehicle. For ease of installation and assembly, resilient members 50, 52 and/or rigid bushings 54, 56 can be two-piece structures inserted into each side of first and second rings 46 and 48.

Figure 7:
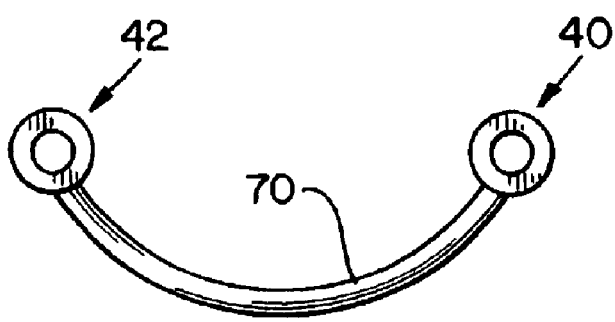

As illustrated in FIGS. 1–4, bending member 44 is a substantially flat or planar member in a U-shaped configuration freely spanning the space between first and second inner end portions 22 and 24. However, to properly fit between first and second inner end portions 22 and 24 of first and second suspension members 14 and 16 on the front or rear of different vehicles, bending member 44 can be of shapes other than the substantially U-shaped configuration shown in FIGS. 1–4. For example, FIG. 5 illustrates a generally S-shaped bending member 62. FIG. 6 illustrates a somewhat hooked-shaped bending member 64 having a U-shaped portion 66 similar to that shown in FIGS. 1–4, but with a linear portion 68 extending therefrom and terminating at second end 42. A generally curved bending member 70 is illustrated in FIG. 7. Other shapes, configurations and combinations thereof also are possible and practical between first end 40 and second end 42, such as, for example, a coil spring configuration, so that compensator 10 freely spans the space between first and second lateral links or suspension members 14 and 16.

With reference to the embodiment of compensator 10 shown in FIG. 1, bending member 44 is placed in either tension or compression as upper and lower anchors 30 and 34 are caused to rotate about first and second pivot pins 18 and 20, respectively. Bending member 44 is placed in tension by downward movement of outer portion 26 of first suspension member 14 or by upward movement of outer end portion 28 of second suspension member 16. When placed in tension, bending member 44 exerts a counter force to such movement, urging outer end portion 26 of first suspension member 14 upwardly and outer end portion 28 of second suspension member 16 downwardly.

Conversely, bending member 44 is placed in compression by either upward movement of outer end portion 26 of first suspension member 14 or downward movement of outer end portion 28 of second suspension member 16. When placed in compression bending member 44 tends to urge outer end portion 26 of first suspension member 14 downwardly and outer end portion 28 of second suspension member 16 upwardly.

Compensator 10 is in substantial alignment with or parallel to the rotational plane defined by first and second pivotal components 32 and 36. Anti-roll compensator 10 thereby operates in simple bending, either in compression or in tension and applies a force counter to the movement of first and second suspension members 14 and 16. Compensator 10 thereby aids in leveling the vehicle and reducing the risk of vehicle roll.

In addition to the variations in the shape of bending member 44, other variations in design and in installation are also possible. As illustrated in FIG. 3, an alternate resilient mounting structure is shown, in which first and second ends 40 and 42 include end rings 80 and 82, respectively integrally formed with bending member 44. Each is surrounded by a resilient member 84, 86 and an external sleeve 88, 90, respectively, each of which may be two-part.

Although FIG. 1 illustrates anti-roll compensator 10 of the present invention installed in cantilevered arrangement on one side of individual first and second lateral links or suspension members 14 and 16, those skilled in the art will readily understand that a stabilizer system may include forward and rearward suspension components on each side. For example, in FIG. 4 first suspension member 14 includes a forward component 92 and a rearward component 94 and second suspension members 16 includes a forward component 96 and a rearward component 98. Compensator 10 is advantageously installed between the respective forward and rearward components in a double shear clevis mount, which can be advantageous over the cantilever mount shown in FIGS. 1–3.

Bending members 44, 62, 64 and 70 are illustrated with substantially consistent thickness along the length thereof. However, it is also anticipated that in some uses of the present invention it may be advantageous to use a bending member shaped in cross-section to achieve the desired bending characteristics thereof. The use of oriented fiber composite materials also allows control and design of response characteristics. Bending members 44, 62, 64, 70 and other forms thereof not shown can be of different shapes in cross-section, including but not limited to round, square, rectangular, oval, flat, "X"-shaped, "L"-shaped, "T"-shaped, etc. Bending members 44, 62, 64 and 70 and other forms thereof not shown can be solid, hollow or partly hollow and partly solid.

The present invention can be used advantageously in a variety of different suspension systems including rigid lateral links, and cooperatively interconnects the lateral links on opposite sides of the vehicle about the pivotal connection thereof to the vehicle. The present invention provides a simple, inexpensive and reliable anti-roll compensator that can be manufactured easily and inexpensively for a variety of different suspension systems. Since the compensator freely spans a space between suspension system lateral links, and is resiliently mounted, vibrations and other movements are not transmitted directly to the passenger compartment.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A stabilizer system for a vehicle having a suspension system including first and second lateral links with spaced inner end portions, said stabilizer system comprising:

first and second pivotal components connected to said first and second lateral links and pivotal about corresponding first and second pivotal axes at said inner ends of said first and second lateral links, respectively;

an upper anchor above said first pivotal axis end associated with said first pivotal component to pivot about said first pivotal axis upon movement of said first lateral link;

a lower anchor below said second pivotal axis and associated with said second pivotal component to pivot about said second pivotal axis upon movement of said second lateral link; and a beaning member having a first end connected to said upper anchor and a second end connected to said lower anchor, said bending member including a non-linear segment between said first and second ends, and said bending member configured and arranged with said upper and lower anchors to be placed in one of tension and compression by pivotal movement of at least one of said first and second pivotal components.

2. The stabilizer system of claim 1, said first and second lateral links each having a forward member and a rearward member, and said bending member connected between said forward and rearward members of each said lateral link.

3. The stabilizer system of claim 1, said bending member being steel.

4. The stabilizer system of claim 1, said bending member being a composite plastic.

5. The stabilizer system of claim 4, said bending member having oriented fibers therein.

6. The stabilizer system of claim 1, said bending member being S-shaped.

7. The stabilizer system of claim 1, said bending member being U-shaped.

8. The stabilizer system of claim 1, said bending member having a U-shaped portion and a linear portion.

9. The stabilizer system of claim 1, said bending member having a curved segment.

10. The stabilizer system of claim 1, said bending member first and second ends including resilient members.

11. A stabilizer for a vehicle suspension system having first and second pivotal components pivotal about a first axis and a second axis, respectively, said first pivotal component including a first anchor above said first axis and said second pivotal component including a second anchor below said second axis, said stabilizer comprising:

a bending member having a first end connected to said first anchor and a second end connected to said second anchor, said member having a curved segment between said first and second ends, and said bending member freely spanning a space between said first and second anchors, said bending member configured and arranged with said upper and lower anchors to be placed in one of tension and compression by pivotal movement of at least one of said first and second pivotal components.

12. The stabilizer of claim 11, said bending member defining a plane aligned with said first and second anchors.

13. The stabilizer of claim 11, said member being metal.

14. The stabilizer system of claim 11, said member being plastic.

15. The stabilizer of claim 11, said member being U-shaped.

16. The stabilizer of claim 11, said member being S-shaped.

17. The stabilizer of claim 11, said member having a U-shaped portion and a linear portion.

18. An anti-roll compensator for a vehicle suspension system, for damping compression and tension loads applied between first and second pivotal anchors of the vehicle suspension system, the compensator comprising:

a bending member having first and second ends connected to said first and second anchors, said member having a bent segment between said first and second ends and said bending member freely spanning a space between said first and second anchors and being in substantial alignment therewith to be placed in one of tension and compression by movement of at least one of said first and second pivotal anchors.

19. The suspension member of claim 18, said member being metal.

20. The suspension of claim 18, said member being composite plastic.

* * * * *